United States Patent Office 2,837,891
Patented June 10, 1958

2,837,891

EXTINGUISHMENT OF ROCKET PROPELLANT FIRES

Raymond R. Stasiak, Enon, Ohio, assignor to the United States of America as represented by the Secretary of the Air Force No Drawing. Application March 31, 1954
Serial No. 420,223

3 Claims. (Cl. 60—35.4)

(Granted under Title 35, U. S. Code (1952), sec. 266)

The invention described herein may be used and practiced by and for the Government for governmental purposes without payment to me of any royalty thereon.

This invention relates to a process and a method of extinguishing fires and more particularly fires involving rocket propellants.

Rocket propellants consist of a fuel and an oxidizer of that fuel. The fuel commonly is a compound consisting of the elements of carbon and hydrogen. The oxidizer is a compound capable of oxidizing the rocket propellant fuel.

In past processes and methods fires have been extinguished on the principles of applying to a fire the products of combustion in excess or in separating the fuel from its oxidant, that quite commonly has been air because of its free accessibility.

As will be quite apparent from the nature of the problem of extinguishing rocket propellant fires, the application to such a fire of reagents that are the ordinary products of combustion, such as water and carbon dioxide, are entirely ineffectual in forcing the involved reactions toward the left, as also are smothering agents that operate on the principle of their being inserted as a barrier between fuel and air.

Compounds that have been advanced in the past as fire extinguishing compounds and that by experimentation have proven themselves to be wholly ineffectual as fire extinguishing compounds when applied to rocket propellant fires include dichlorodifluoromethane, chlorobromomethane, dichlorobromomethane, trichlorobromomethane, etc. Associates of the present inventor published "Evaluation of Organic Fluorine Compounds for Use in Military Aircraft" by Harold Rosenberg and J. C. Mosteller in Industrial and Engineering Chemistry 45:10:2283 in October 1953.

As a result of extensive experimentation, the extinguishing of rocket propellant fires was believed to be impossible until quite recently when the present invention was accomplished.

Rocket propulsion systems include a fluid fuel and a fluid oxidant of that fuel, separately stored in tanks or other containers and separately conducted from the storage tanks through pipes to the rocket combustion chamber where the fuel and its oxidant are combined to furnish propulsion for the rocket.

The present invention, in a similar manner, concerns fluids stored apart from the rocket propulsion fuel and its oxidant and that may be pumped through pipes or other conductors to fluid discharge outlets inclusive of the rocket combustion chamber.

The present invention has as an object the injecting into reacting thrust rocket propellants of an extinguisher compound or a mixture of extinguisher compounds capable of stopping the reaction.

Another object is to provide a means for controlling, retarding and inhibiting to the extent of arresting in part or in its entirety the reactivity of rocket fuel and rocket fuel oxidizer combinations of both hypergolic and non-hypergolic types.

A further object is to provide conveniently stored, conducted, controlled and applied fire retardants of rocket propellants applicable to both fixed and automatic fire prevention systems and to portable fire extinguisher apparatus and applicable to both piloted and unpiloted rocket aircraft.

Another object is to provide a method for controlling normal and abnormal rocket propellant reactivity or combustion during refueling operations, such as spill fires, puddle fires and the like, as well as normal and abnormal rocket propellant combustion within rocket chambers, rocket accessory sections and elsewhere.

Rocket propellants used in rocket powered aircraft commonly consist of a fuel and an oxidizer of that fuel that are stored and handled as separate fluids until they are brought together in the combusion chamber of the aircraft.

When brought together within the aircraft combustion chamber, the fuel and the fuel oxidizer, independently of their ambient surroundings, combine exothermally in a temperature range from about 2000 to 4000° F. and at chamber pressures of about 300 pounds per square inch in accomplishing the propulsion of the rocket missile or other aircraft at rates of speed never previously attained by man for his machines.

Rocket propellant fuel, as contemplated hereby, may be a carbon and hydrogen compound illustratively of the proportion $C_9H_{20}$, of which representative compounds not containing oxygen are gasoline, xylidine and the like, and those containing oxygen are ethanol, furfuryl alcohol, etc., and their equivalents.

Rocket propellant fuel oxidants, as contemplated hereby, are oxygen sources on decomposition, such illustratively as fuming nitric acid of below about 5% water content, liquid oxygen and their equivalents.

The present invention is based on the experimentally successful practice of injecting into reacting thrust rocket propellants another reactant which introduces a preferential chemical reaction to thereby retard, inhibit or to arrest completely the reaction between the rocket propellants. The other reactant so introduced, as contemplated hereby is either dibromodifluoromethane or bromotrifluoromethane or mixtures of these compounds or their equivalents.

These compounds have proven to be exceptionally effective in suppressing rocket propellant pan and puddle fires, in rocket accessory fires and in the control in degree of violence of the reactions within the missile or rocket combustion chambers. The reactant or mixture of reactants used as a fire extinguisher preferably is in a fluid state and is applied directly to the reaction between the fuel and its oxidant, into a fire thereof, or is projected into the atmosphere in the immediate proximity of the fires.

The two above inhibitors as fluids are conveniently stored, conducted in and dispensed from glass, porcelain or metal containers, pipes, conduits, pumps and the like. These reactant compounds may be dispensed from force operated equipment permanently installed as fixed aircraft fire extinguishing systems or from manually operated portable extinguishers available for emergency and abnormal situations. The related reagent tribromofluoromethane theoretically should serve as an equivalent inhibitor of rocket propellant fires.

What I claim is:

1. In the control of spill fires, puddle fires, resulting from aircraft refueling operations involving a fuel selected from the group consisting of gasoline, xylidine, ethanol and furfuryl alcohol; and a fuel oxidant selected from the group consisting of fuming nitric acid and liquid oxygen; the step of adding to the fire a fire arresting fluid selected from the group consisting of dibromodifluoromethane and bromotrifluoromethane in ample quantity to control the fire.

2. The process of reacting together a fuel selected from the group which consists of gasoline, xylidine, ethanol and furfuryl alcohol; with an oxidant selected from the group which consists of fuming nitric acid and liquid oxygen; and an extinguisher selected from the group which consists of dibromodifluoromethane and bromotrifluoromethane.

3. The process of reacting together within a combustion chamber at a temperature between 2,000 and 4,000 degrees Fahrenheit and at a pressure in the order of 300 pounds per square inch; a fuel selected from the group which consists of gasoline, xylidine, ethanol and furfuryl alcohol; with an oxidant selected from the group which consists of fuming nitric acid and liquid oxygen; and a reaction retardant selected from the group which consists of dibromodifluoromethane and bromotrifluoromethane.

References Cited in the file of this patent

UNITED STATES PATENTS

| | | |
|---|---|---|
| 2,584,803 | Hannum | Feb. 5, 1952 |
| 2,653,130 | Eiseman, Jr. | Sept. 22, 1953 |

OTHER REFERENCES

Rosenberg et al.: "Evaluation of Organic Fluorine Compounds for Use in Military Aircraft," Ind. and Eng. Chem., vol. 45, No. 10, Oct. 1953, pp. 2283–2286.